(12) United States Patent
Leng

(10) Patent No.: US 6,828,595 B2
(45) Date of Patent: Dec. 7, 2004

(54) LIGHT SHIELD CUM GAP FILL SCHEME FOR MICRODISPLAY BACKPLANE FABRICATION

(75) Inventor: Xavier Seah Teo Leng, Singapore (SG)

(73) Assignee: Chartered SemiconductorsManufacturing Limited, Singapore (SG)

( * ) Notice: Subject to any disclaimer, the term of this patent is extended or adjusted under 35 U.S.C. 154(b) by 410 days.

(21) Appl. No.: 10/012,295

(22) Filed: Nov. 13, 2001

(65) Prior Publication Data

US 2003/0092258 A1 May 15, 2003

(51) Int. Cl.[7] .................. H01L 33/00; H01L 31/00; H01L 31/0232; G02F 1/1333; G02F 1/1335
(52) U.S. Cl. .................. 257/98; 257/88; 257/91; 257/92; 257/103; 257/431; 257/435; 257/437; 349/122; 349/137; 349/138
(58) Field of Search .................. 257/88, 98; 349/137, 349/138

(56) References Cited

U.S. PATENT DOCUMENTS

| | | | | | |
|---|---|---|---|---|---|
| 5,486,485 A | * | 1/1996 | Kim et al. | ...... | 438/29 |
| 5,789,761 A | * | 8/1998 | Ihara et al. | ...... | 257/59 |
| 5,834,125 A | * | 11/1998 | Lien | ...... | 428/448 |
| 5,926,240 A | * | 7/1999 | Hirota et al. | ...... | 349/114 |
| 6,017,780 A | * | 1/2000 | Roy | ...... | 438/152 |

OTHER PUBLICATIONS

Wolf et al., Silicon Processing for the VLSI Era (2000), Lattice Press, Second Edition, vol. 1, pp. 523–527.*

* cited by examiner

Primary Examiner—Carl Whitehead, Jr.
Assistant Examiner—David L. Hogans

(57) ABSTRACT

A light shield apparatus and formation method for preventing the transmission of incident light towards active devices of the display. In one embodiment, the present invention recites forming a plurality of metal pixels wherein adjacent ones of the plurality of metal pixels have a gap region disposed therebetween. The present embodiment then recites depositing a light absorbing antireflective coating material within the gap region to form a light shield such that transmission of incident light through the gap region towards underlying active devices is reduced. Hence, the present embodiments also reduce problems associated with Liquid Crystal alignment difficulty and passivation integrity (cracking of thin passivation). Next, the present embodiment deposits a thin composite passivation layer above the plurality of metal pixels and the antireflective coating material. As a result, the antireflective coating material disposed in the gap region reduces the transmission of incident light between the metal pixels and towards the active devices of the display and alleviates problems associated with excessive step height between metal pixels.

7 Claims, 18 Drawing Sheets

LIGHT SHIELD CUM GAP FILL SCHEME FOR MICRODISPLAY BACKPLANE FABRICATION

FIELD OF THE INVENTION

The present claimed invention relates to the field of display device technology. More particularly, the present claimed invention relates to a display device formation method and apparatus for reducing ambient light penetration into a display device.

BACKGROUND ART

Liquid crystal display devices (LCDs) are well known in the art. In particular, microdisplays are the finest panel displays which offer low power, high resolution and greater functional integration. Common to many microdisplay concepts is the use of CMOS (complementary metal oxide silicon) backplane upon which a light modulating layer is placed. Typically in microdisplays, the topmost level fabricated on the bottom substrate (sometimes referred to as the "backplane") is an array of metal pixels which are coupled to underlying transistors. A layer of liquid crystal material is disposed over the metal pixels. By selectively controlling the underlying transistors, an electric field can be generated at the array of metal pixels. This electric field, in turn, causes the liquid crystal material to selectively allow for the transmission of light therethrough. In so doing, the display is controlled to produce an image. For a microdisplay based on liquid crystal on silicon (LCOS) technology, the backplane is subjected to strong incident light in order to project a produced image onto a focal plane.

Unfortunately, subjecting a LCOS microdisplay to strong incident light can have deleterious consequences. Specifically, such strong incident light poses a potential threat to device operation due to photoelectron generation and interference. That is, in some conventional displays incident light can penetrate through the upper portion of the backplane and affect the operation of underlying active devices.

As yet another drawback to some conventional microdisplay devices, a thin passivation layer is required on top of the metal pixel to achieve optimal reflectance and a reduced voltage drop across the passivation layer.

In addition, excessive step height differences between pixels can occur. Such step height differences are caused, for example, by a need to overetch the metal layer comprising the array of metal pixels. Such excessive step height coupled with a thin passivation layer can result in poor sidewall coverage and may ultimately compromise passivation integrity. In all LC devices, the LC optic axis needs to be uniformly aligned to deliver desired optical performance. This is usually accomplished with an oriented alignment layer (e.g. polyimide) that aligns LC after fill. Excessive gouging between the pixel cases difficulty during the LC alignment process due to nonuniformity of the spin coated polyimide.

Thus, a need exists for a display device formation method and apparatus which reduces the penetration of incident ambient light into the backplane. Still another need exists for a display device formation method and apparatus which meets the above need and reduces the excessive step height between pixels thus reducing liquid crystal alignment difficulty and improving passivation integrity.

SUMMARY OF INVENTION

The present invention provides a display device formation method and apparatus which reduces the penetration of incident ambient light into the backplane. The present invention further provides a display device formation method and apparatus which achieves the above accomplishment and reduces the excessive step height between pixels thus reducing liquid crystal alignment difficulty and improving passivation integrity.

In one embodiment, the present invention recites forming a plurality of metal pixels wherein adjacent ones of the plurality of metal pixels have a gap region disposed therebetween. The present embodiment then recites depositing a light absorbing antireflective coating (ARC) material within the gap region to form a light shield such that transmission of incident light through the gap region towards underlying active devices is reduced. Next, the present embodiment deposits a passivation layer above the plurality of metal pixels and the ARC material to passivate the backplane. As a result, the ARC material disposed in the gap region reduces the transmission of incident light between the metal pixels and towards the active devices of the display.

In yet another embodiment, the present invention includes the steps of the above-described embodiment and further comprises depositing a layer of liner material prior to depositing a conductive layer of antireflective coating material.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrates embodiments of the invention and, together with the description, serve to explain the principles of the invention.

PRIOR ART

The drawings referred to in this description should be understood as not being drawn to scale except if specifically noted.

DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 3A:
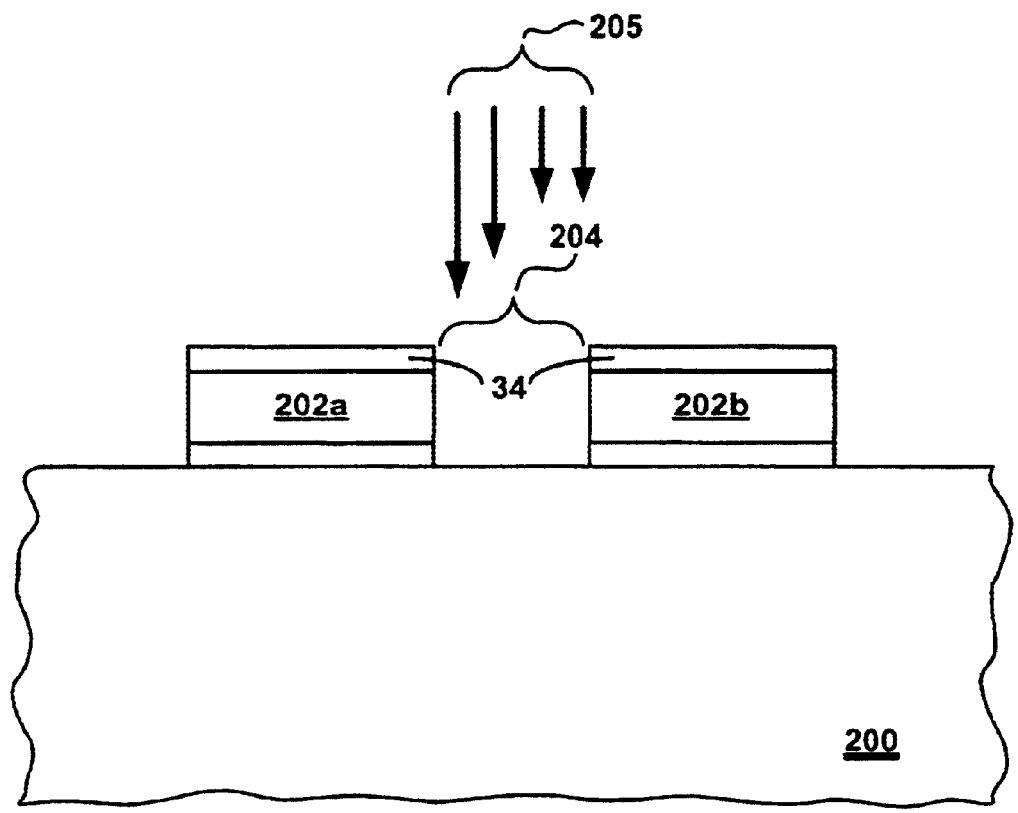
FIG. 3A is a side sectional view of portion of backplane of a display device having a metal pixels formed thereon in accordance with one embodiment of the present claimed invention.
Figure 3B:
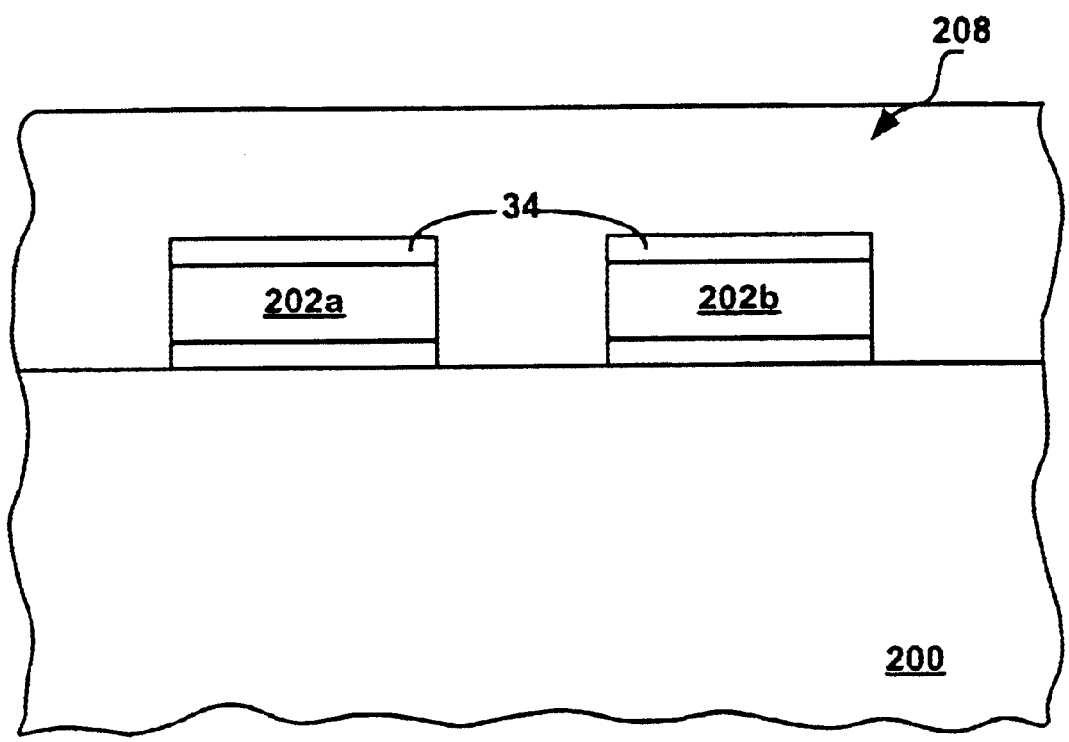
FIG. 3B is a side sectional view of the structure of FIG. 3A wherein a non-conductive, light absorbing, antireflective coating material is deposited thereover in accordance with one embodiment of the present claimed invention.
Figure 3C:
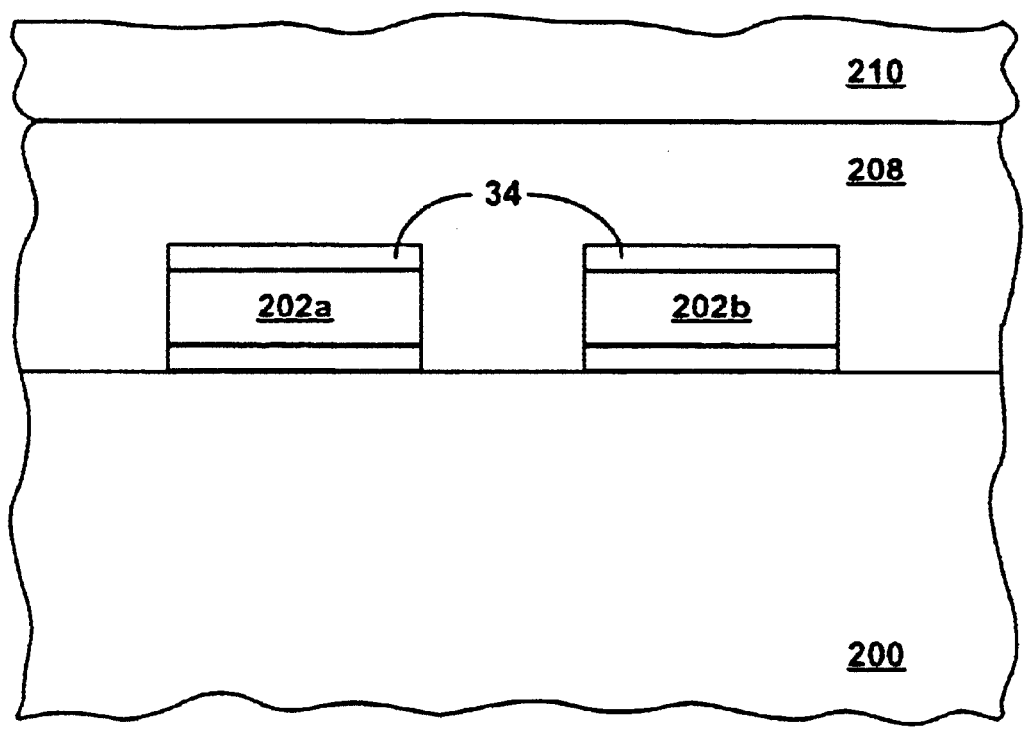
FIG. 3C is a side sectional view of the structure of FIG. 3B wherein a layer of photosensitive material is deposited thereover in accordance with one embodiment of the present claimed invention.
Figure 3D:
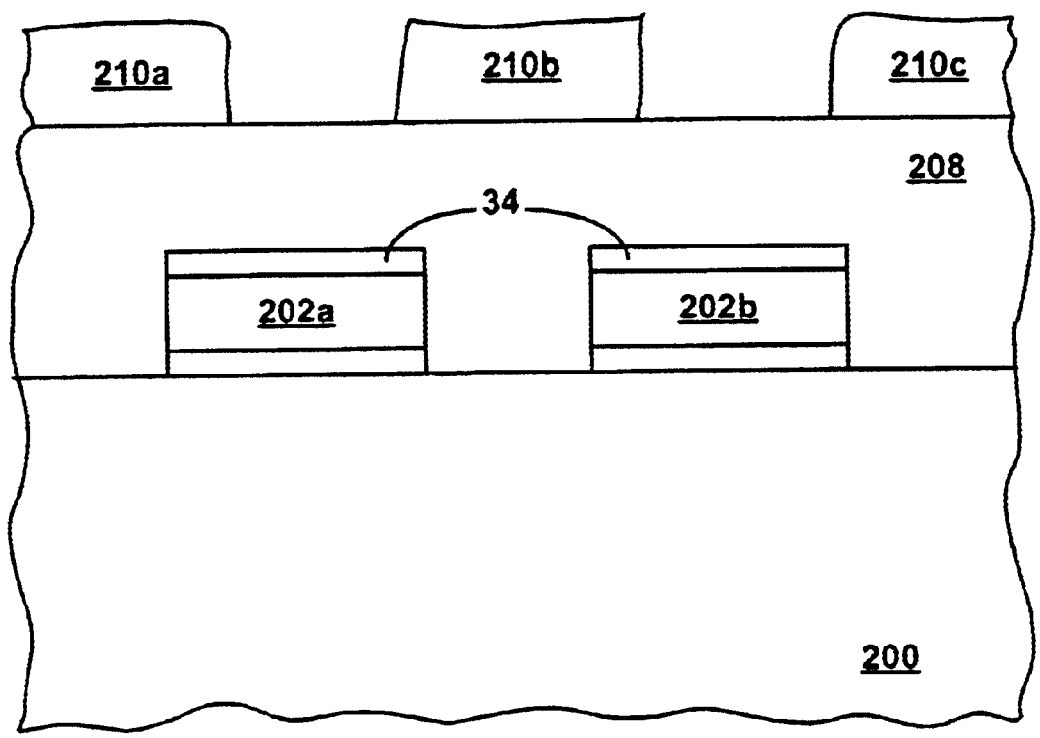
FIG. 3D is a side sectional view of the structure of FIG. 3C wherein the layer of photosensitive material has been patterned in accordance with one embodiment of the present claimed invention.
Figure 3E:
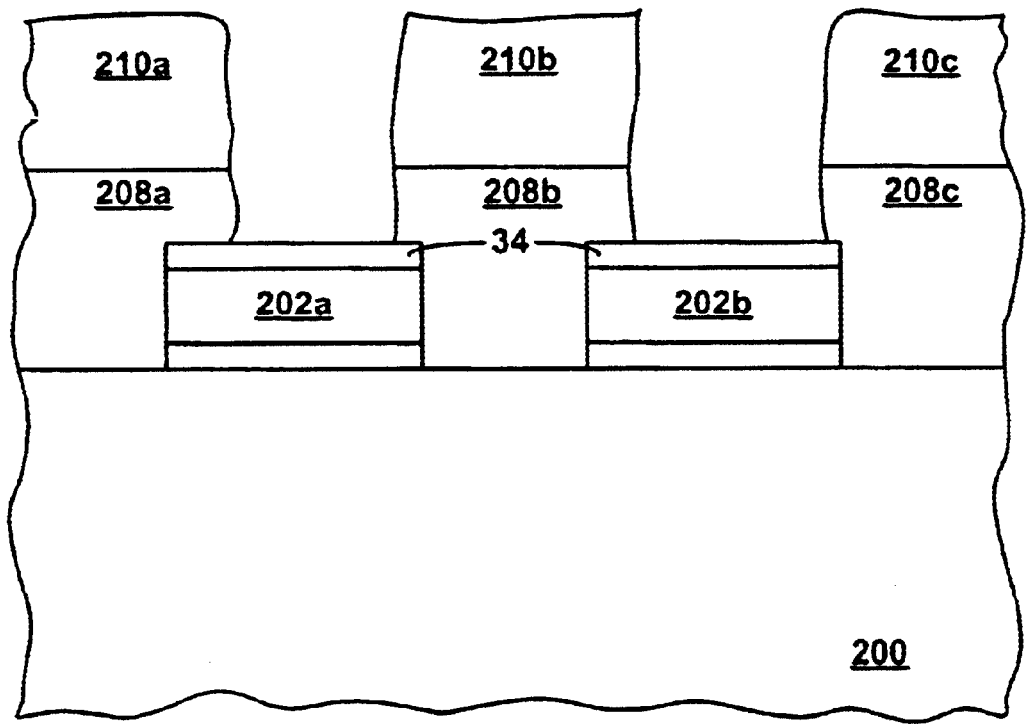
FIG. 3E is a side sectional view of the structure of FIG. 3D wherein the antireflective coating material has been patterned in accordance with one embodiment of the present claimed invention.
Figure 3F:
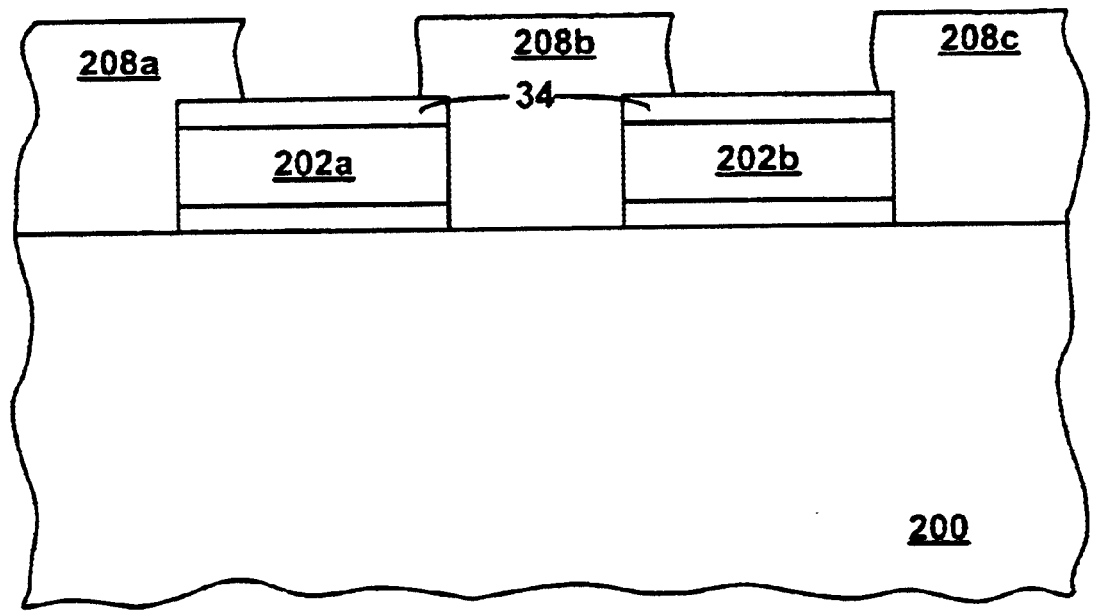
FIG. 3F is a side sectional view of the structure of FIG. 3E wherein the remaining portions of the layer of photosensitive material have been removed in accordance with one embodiment of the present claimed invention.
Figure 3G:
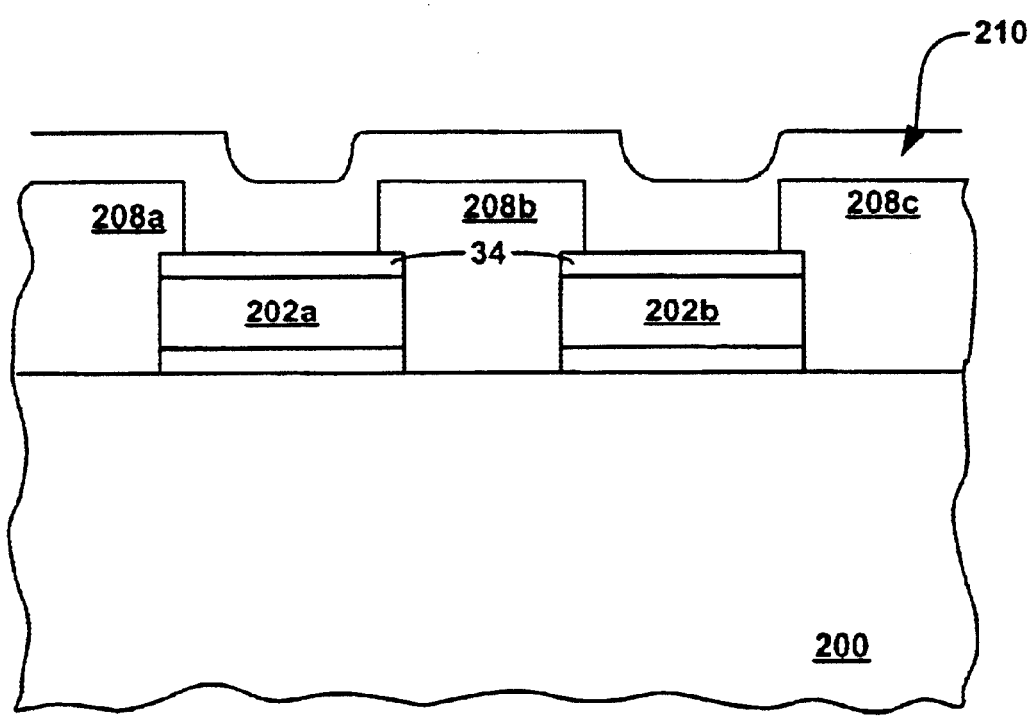
FIG. 3G is a side sectional view of the structure of FIG. 3F wherein a thin composite nitride/oxide/nitride (NON) passivation layer has been deposited thereover in accordance with one embodiment of the present claimed invention.
Figure 4:
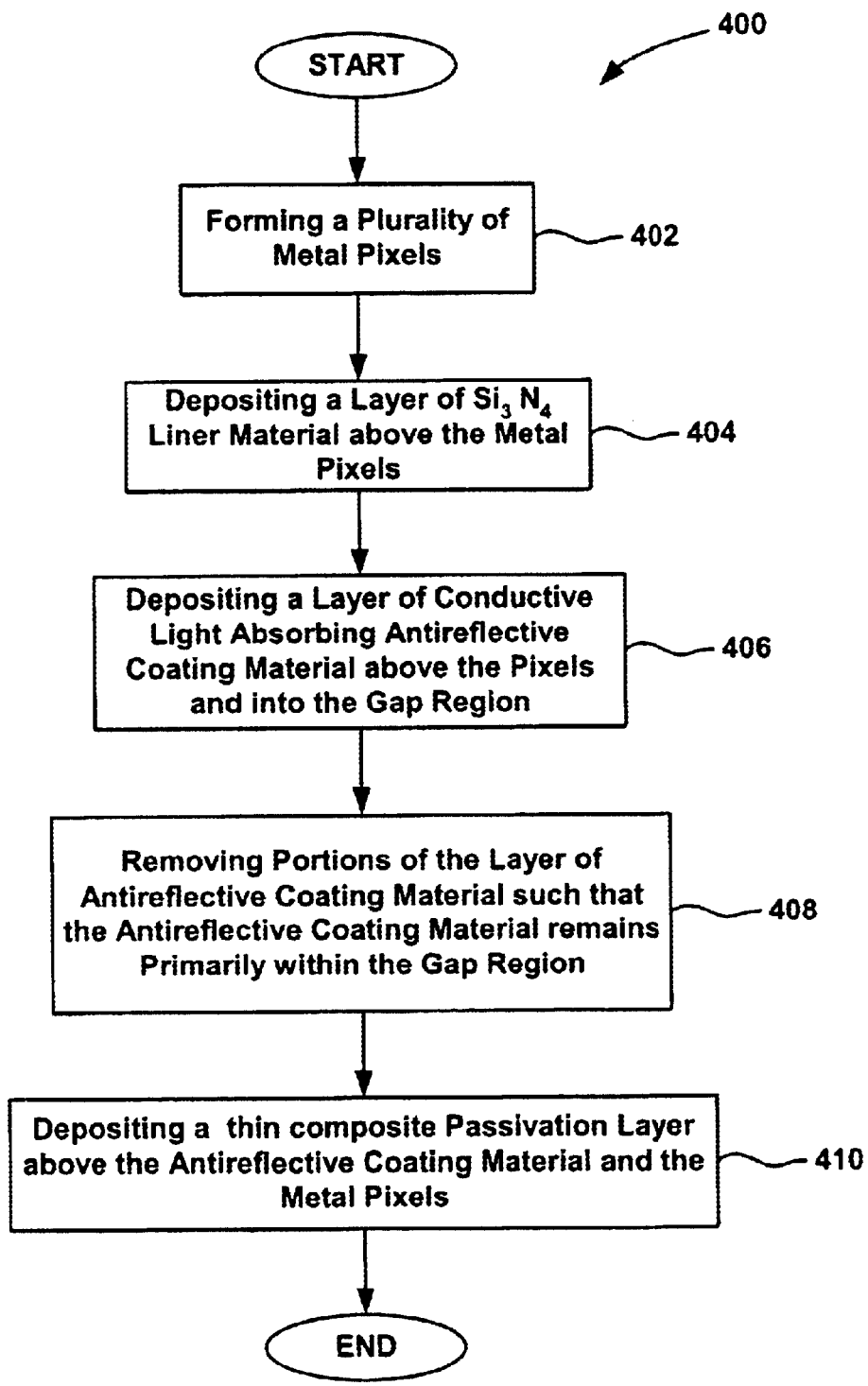
FIG. 4 is a flow chart of steps performed in accordance with one embodiment of the present claimed invention.
Figure 5:
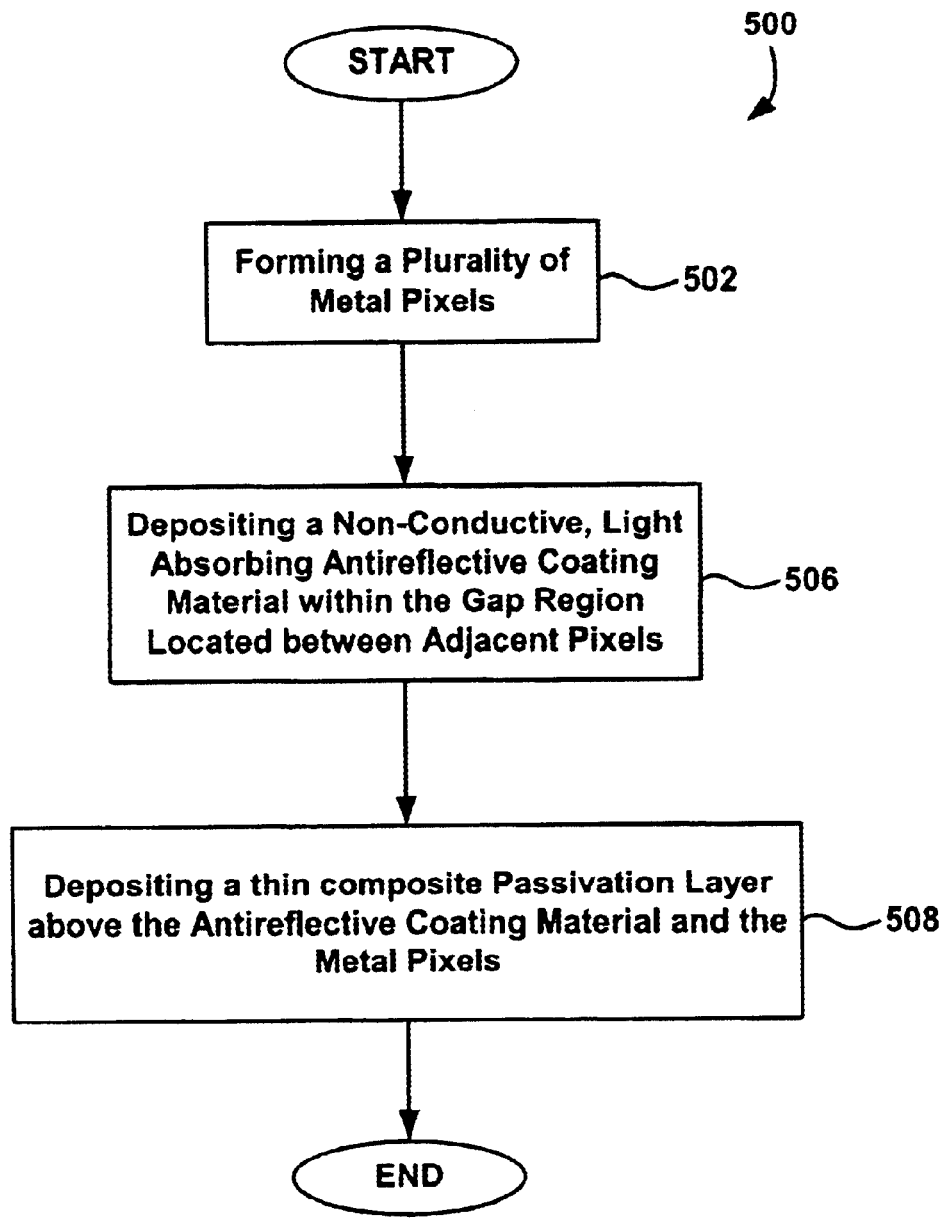
FIG. 5 is a flow chart of steps performed in accordance with another embodiment of the present claimed invention.

FIGS. 2A–2H and 3A–3G provide side sectional views of the structure created according to embodiments of the method of the present invention as set forth in the flow charts of FIGS. 4 and 5. For purposes of clarity, the following discussion will utilize the side sectional views of FIGS. 2A–2H and 3A–3G in conjunction with the flow charts of FIGS. 4 and 5 to clearly describe the embodiments of the present invention. As will be described in detail below, the present embodiments provide a light shield structure for reducing the transmission of incident light through a gap region located between adjacent ones of a plurality of metal pixels such that transmission of incident light through the gap region towards underlying active devices is reduced. Another objective is to act s a gap fill material to improve thin passivation integrity and LC alignment problem.

Figure 1:
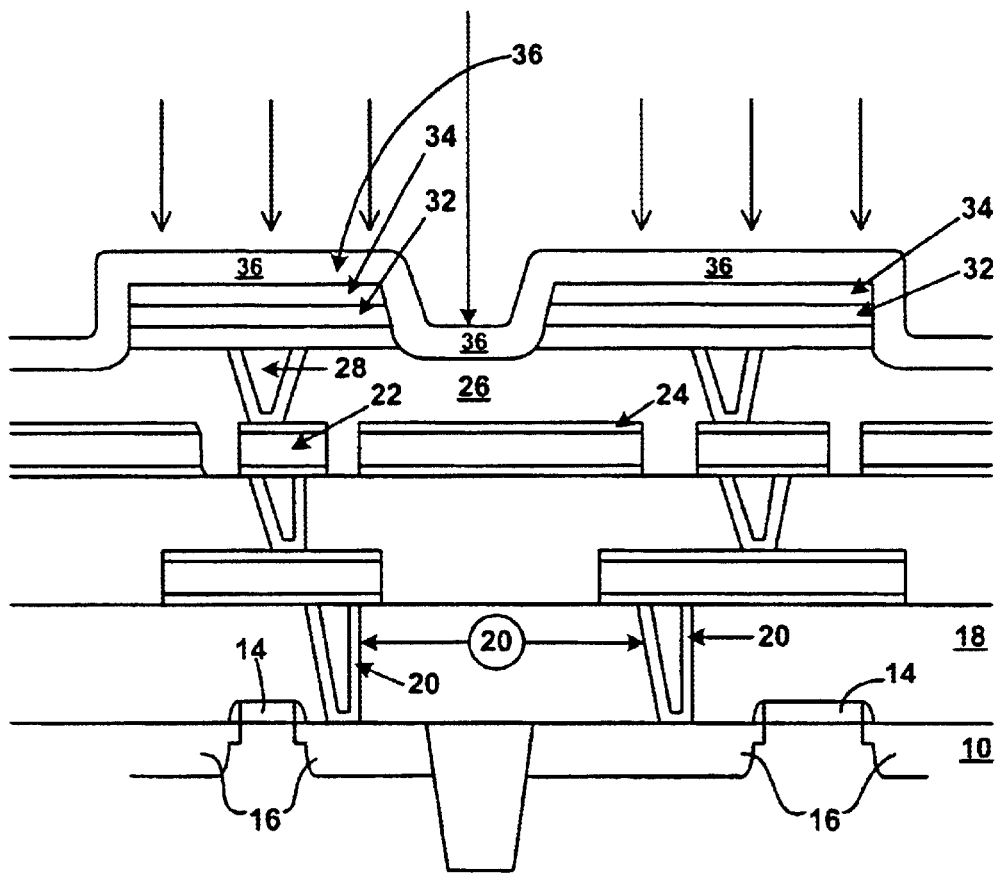
FIG. 1 is a side sectional view of a portion of a CMOS backplane of a LCOS microdisplay formed according to conventional methods.

First, referring briefly to Prior Art FIG. 1 for background information, a side sectional view of a portion of a conventional CMOS backplane structure for a microdisplay is shown. The structure of Prior Art FIG. 1 is presented here for purposes of illustration of the elements of certain conventional display devices. The embodiments of the present invention are not limited to use solely with such a structure and such elements. Specifically, the embodiments of the present invention are well suited to use with display device structures: which are comprised of a lessor or greater number of metal layers; which contain additional elements; or which contain fewer elements. Furthermore, although portions of the following discussion may specifically recite the use of various embodiments of the present invention in conjunction with a microdisplay, the present invention is well suited to use with various types of display devices other than microdisplays. Referring again to Prior Art FIG. 1, there is shown a semiconductor substrate 10, preferably composed of monocrystalline silicon. Semiconductor device structures which may include polysilicon gate electrodes 14 and source and drain regions 16 are shown which in combination comprise the active devices of the display device. An insulating layer 18 is formed overlying the semiconductor device structures. Between the polysilicon gate electrodes and the top mirror layer, there can be one or more (up to five) metal layers for interconnection purposes having intermetal dielectric layers therebetween.

A barrier/glue layer 20, comprising titanium/titanium nitride is deposited over a contact hole and tungsten (W) is deposited and etched back or polished away so that a W plug is formed. Another barrier/glue material such as Ti/TiN, is then deposited before a layer of conducting material, such as aluminum or an aluminum alloy, is deposited over the barrier/glue layer and patterned to form metal limes 22. An anti-reflective coating (ARC) layer 24 may be deposited over the metal layer before patterning. An insulating layer 26, such as silicon dioxide, undoped silicate glass(USG), a tetraethoxysilane (TEOS) oxide, or the like, is deposited over the metal lines. Openings are etched through the insulating layer 26 to the metal lines, and a barrier material is deposited over the insulating layer and within the opening and then etched back to form tungsten plugs 28. Another barrier layer 30 and metal layer is deposited over the insulating layer 26. The top metal layer is typically aluminum or an aluminum alloy, such as AlCu or AlCuSi, with a TEOS hardmask layer 34.

With reference still to Prior Art FIG. 1, composite passivation layer 36 of an oxide/nitride stack oxide (can be as many as six layers) is deposited over the top metal pixel layer, optimized for reflectance. In one embodiment, the oxide/nitride stack is comprised of oxide (O), or oxide/nitride (ON), or oxide/nitride/oxide (ONO). In another embodiment, the oxide/nitride stack is comprised of nitride (N), or nitride/oxide (NO), or nitride/oxide/nitride (NON). In one embodiment, the O, ON, ONO, N, No, or NON layers will have a total thickness of between about 500 and 4,000

Angstroms. The thinner top metal stack (approximately 2000–3000 Angstroms) including the TEOS cap 34 is patterned to form the reflective metal pixels 32. As mentioned above, the structure of Prior Art FIG. 1 is presented here for purposes of illustration of certain conventional display device characteristics, and the embodiments of the present invention are not limited solely to use with a display device having precisely the same structure and elements shown in Prior Art FIG. 1.

Figure 2A:
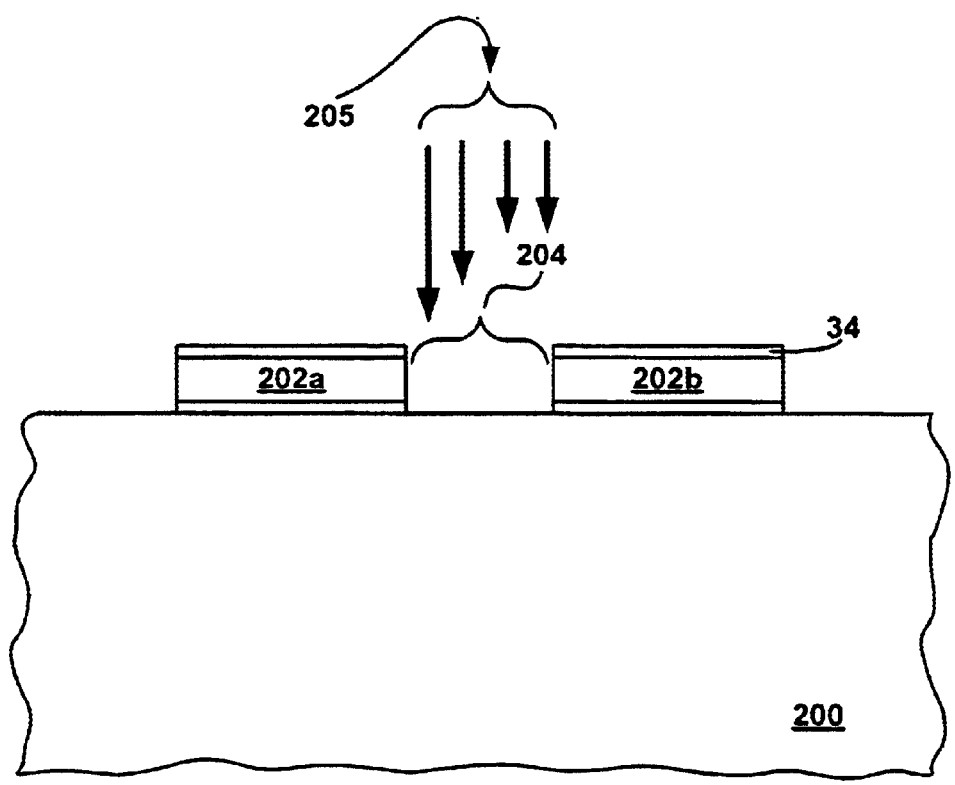
FIG. 2A is a side sectional view of a portion of a CMOS backplane of a microdisplay having a metal pixels formed thereon in accordance with one embodiment of the present claimed invention.

With reference now to FIG. 2A, a side sectional view of a portion of a backplane of an LCD structure is shown. The structure of FIG. 2A shows a plurality of metal pixels formed above a substrate. For purposes of clarity, many of the underlying elements (such as, for example, those shown in Prior Art FIG. 1) are not shown in FIG. 2A. Furthermore, although not shown in FIG. 2A, for purposes of clarity, it will be understood that metal pixels 202a and 202b are electrically coupled to underlying structures which extend into substrate 200 (e.g. active devices 14). Additionally, the present embodiment is well suited to use with a plurality of metal pixels which are formed at a metal layer other than the metal layer of FIG. 2A. That is, the present embodiments are not limited to use with metal pixels formed using a specific one of the many metal layers used in the formation of conventional LCD devices. Also, although only two metal pixels 202a and 202b are shown in FIG. 2A, it will be understood that such a limited number of metal pixels is shown for purposes of clarity.

Referring still to FIG. 2A and now to step 402 of FIG. 4, in the present embodiment, the plurality of metal pixels 202a and 202b are formed having a gap region 204 disposed therebetween. In some instances, the depth of gap region 204 may be exacerbated by overetching of the metal layer from which metal pixels 202a and 202b are formed. As mentioned above, this gap depth (also referred to a step height) can result in poor sidewall coverage and may ultimately compromise the integrity of a subsequently deposited thin layer of passivation. In addition, it leads to LC alignment difficulty. As shown in FIG. 2A, incident light, represented by arrows 205, may pass through gap region 204 between metal pixels 202a and 202b and ultimately impinge underlying active devices (e.g. active devices 14 of Prior Art FIG. 1) after several reflections. Such impingement by incident light 205 poses a threat to device operation due to photoelectron generation/interference. As will be discussed below, the present invention provides a solution to the aforementioned problem. In one embodiment, a layer 34 (TEOS cap) is formed above metal pixels 202a and 202b.

Figure 2B:
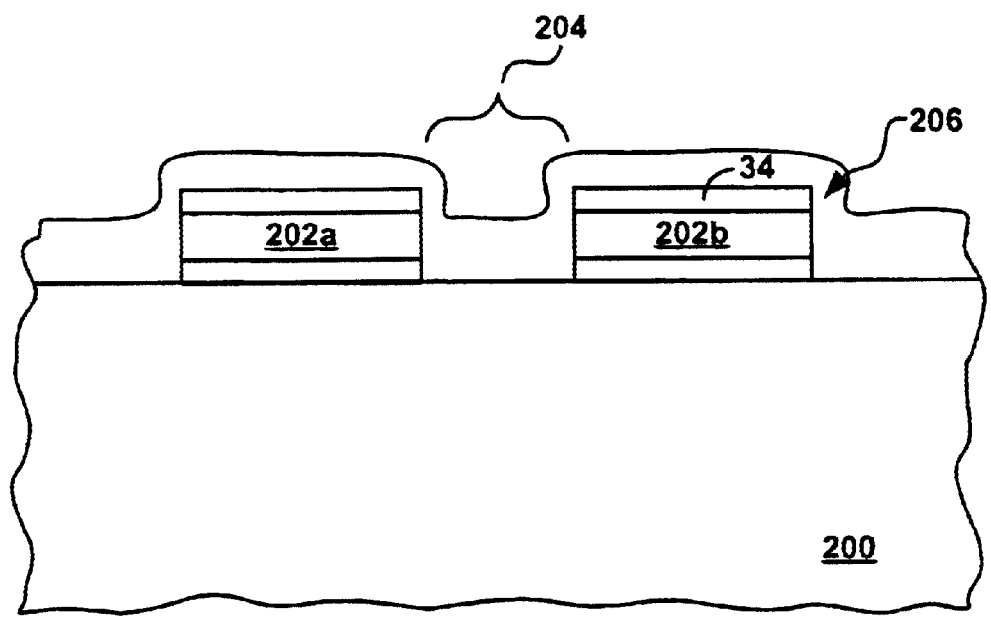
FIG. 2B is a side sectional view of the structure of FIG. 2A having a $Si_3N_4$ liner layer deposited thereover in accordance with one embodiment of the present claimed invention.

With reference next to step 404 and FIG. 2B, the present embodiment deposits a layer of liner material 206 above metal pixels 202a and 202b and into gap region 204. In one embodiment, layer of liner material 206 is comprised of a non-conductive material such as, for example, $Si_3N_4$. In the present embodiment, layer of liner material 206 provides an insulating barrier between a subsequently deposited conductive ARC material such as TiN (to be discussed in detail below) and electrically conductive elements such as, for example, metal pixels 202a and 202b. However, the present invention is also well suited to an embodiment in which a layer of liner material is deposited even though material to be subsequently deposited is not conductive. Additionally, in one embodiment of the present invention, layer of liner material 206 is deposited with a thickness of approximately 500 Angstroms. Although such a thickness is recited for layer of liner material 206 in the present embodiment, the present invention is well suited to the use with a layer of liner material which is deposited to a greater or lesser depth.

Figure 2C:
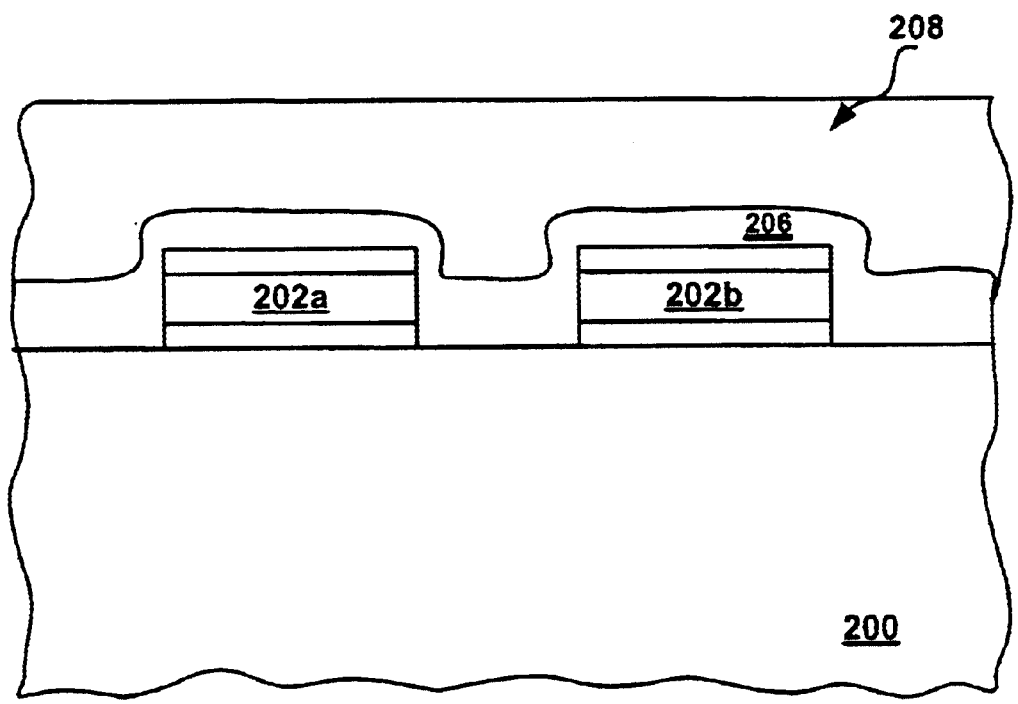
FIG. 2C is a side sectional view of the structure of FIG. 2B wherein a conductive light absorbing antireflective coating material is deposited thereover in accordance with one embodiment of the present claimed invention.

Referring now to FIG. 2C, and to step 406, the present embodiment then deposits a layer of light absorbing antireflective coating material 208 above layer of liner material 206, above plurality of metal pixels 202a and 202b and into gap region 204. In one embodiment, antireflective coating material 208 is deposited within gap region 204 to a thickness of approximately 6000–8000 Angstroms. Although such a thickness is recited for the light absorbing antireflective coating material 208 in the present embodiment, the present invention is well suited to the use with a light absorbing antireflective coating material which is deposited to a greater or lesser depth. Furthermore, in one embodiment, the light absorbing antireflective coating material 208 is comprised of an organic antireflective coating material such as, for example, organic bottom antireflective coating (BARC) material. In yet another embodiment, antireflective coating material 208 is comprised of an inorganic antireflective coating material such as, for example, TiN or SiON. Although such materials are recited in the present embodiment, the present embodiment is well suited to the use of various other antireflective coating materials.

Figure 2D:
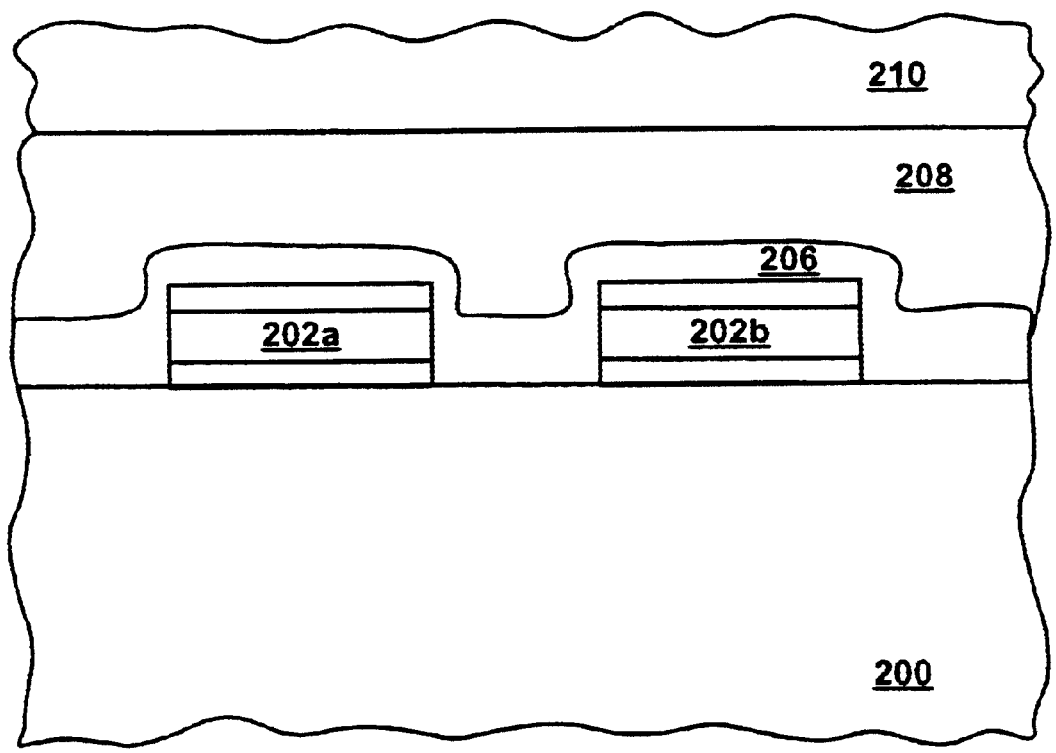
FIG. 2D is a side sectional view of the structure of FIG. 2C wherein a layer of photosensitive material is deposited thereover in accordance with one embodiment of the present claimed invention.
Figure 2E:
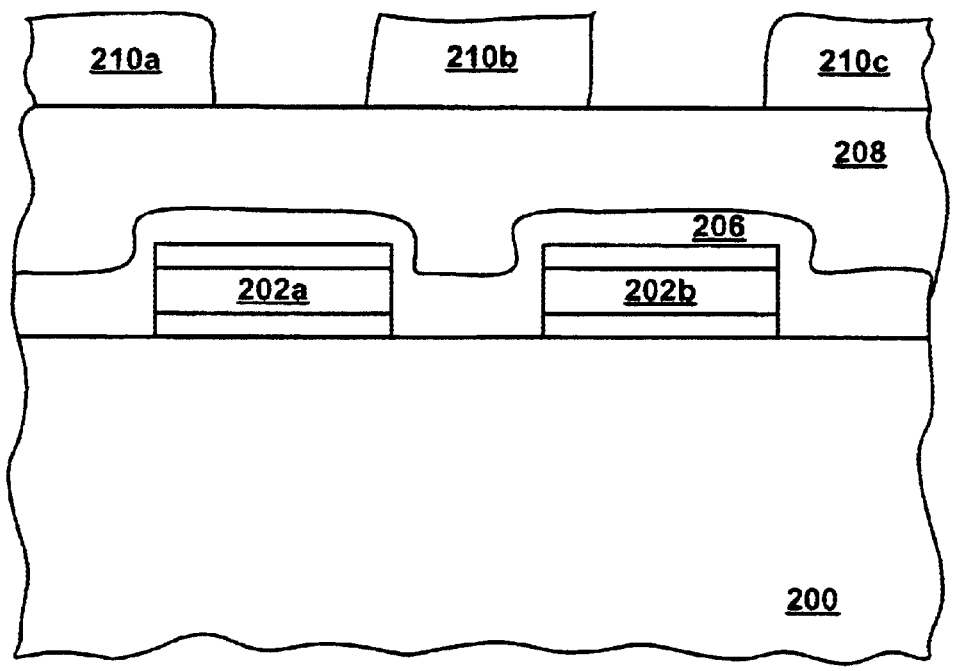
FIG. 2E is a side sectional view of the structure of FIG. 2D wherein the layer of photosensitive material has been patterned in accordance with one embodiment of the present claimed invention.

Referring still to step 406 and now to FIGS. 2D and 2E, in one embodiment of the present invention, a layer of photosensitive material 210 such as, for example, photoresist is deposited above antireflective coating material 208. As shown in FIG. 2E, layer of photosensitive material 210 is then patterned using a reverse of the top metal mask (see e.g. regions 210a, 210b, and 210c) so that the underlying antireflective coating material 208 is placed only above the gap region.

Figure 2F:
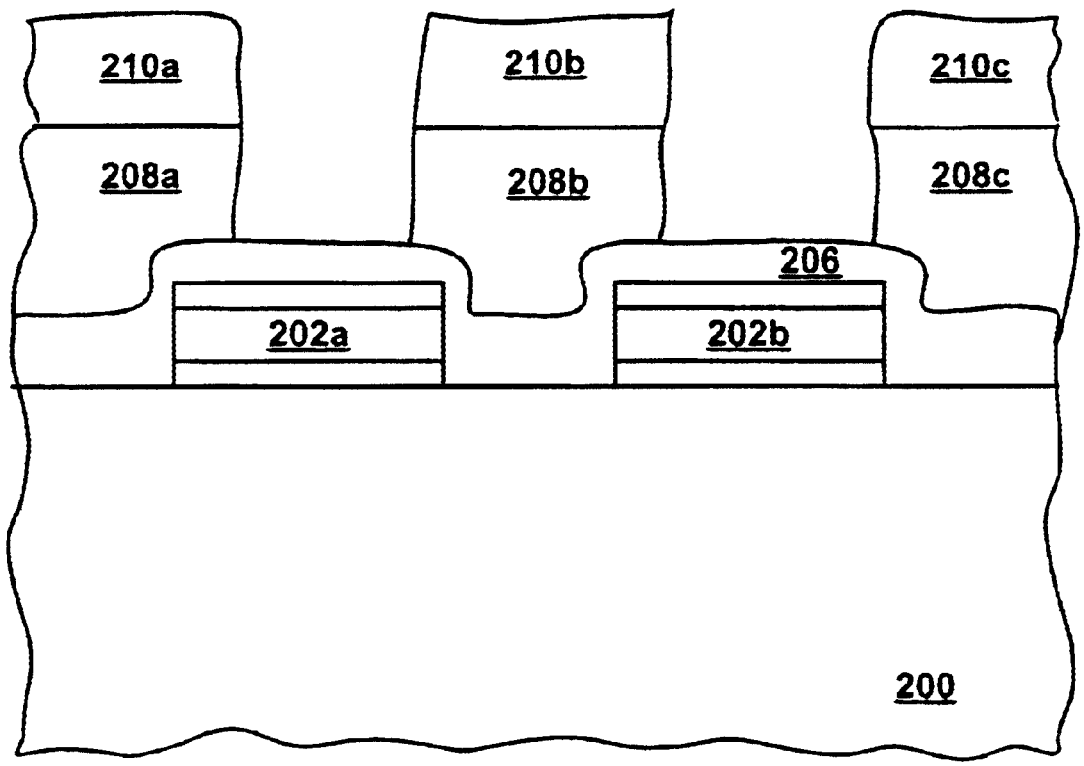
FIG. 2F is a side sectional view of the structure of FIG. 2E wherein the antireflective coating material has been patterned in accordance with one embodiment of the present claimed invention.

Referring now to step 408 and now to FIG. 2F, using the mask formed by regions 210a, 210b, and 210c of layer of photosensitive material 210, the present embodiment substantially removes layer of antireflective coating material 208 from above a huge portion of plurality of metal pixels 202a and 202b such that the antireflective coating material (see e.g. regions 208a, 208b, and 208c) remains primarily within the gap regions (e.g. gap region 204) between the plurality of metal pixels 202a and 202b. That is, those portion of the antireflective coating material which were not covered by the photosensitive material are removed. The remaining portions 208a, 208b, and 208c of the antireflective coating material serve as a barrier to the incident light shown in FIG. 2A. Thus, remaining portions 208a, 208b, and 208c of the antireflective coating material reduce the transmission of incident light 205 through gap region 204 and towards active devices 14 of Prior Art FIG. 1. As a result, the present invention reduces impingement by incident light 205 and alleviates the threat to device operation caused by photoelectron generation/interference.

As shown in FIG. 2F, in one embodiment of the present invention, remaining portions 208a, 208b, and 208c of the antireflective coating material are made to extend slightly over the edges of metal pixels 202a and 202b by slightly underexposing the reverse top metal mask. That is, in one embodiment of the present invention, remaining portions 208a, 208b, and 208c of the layer of antireflective coating material "wrap around" gap region 204 to provide a effective barrier against incident light.

Figure 2G:
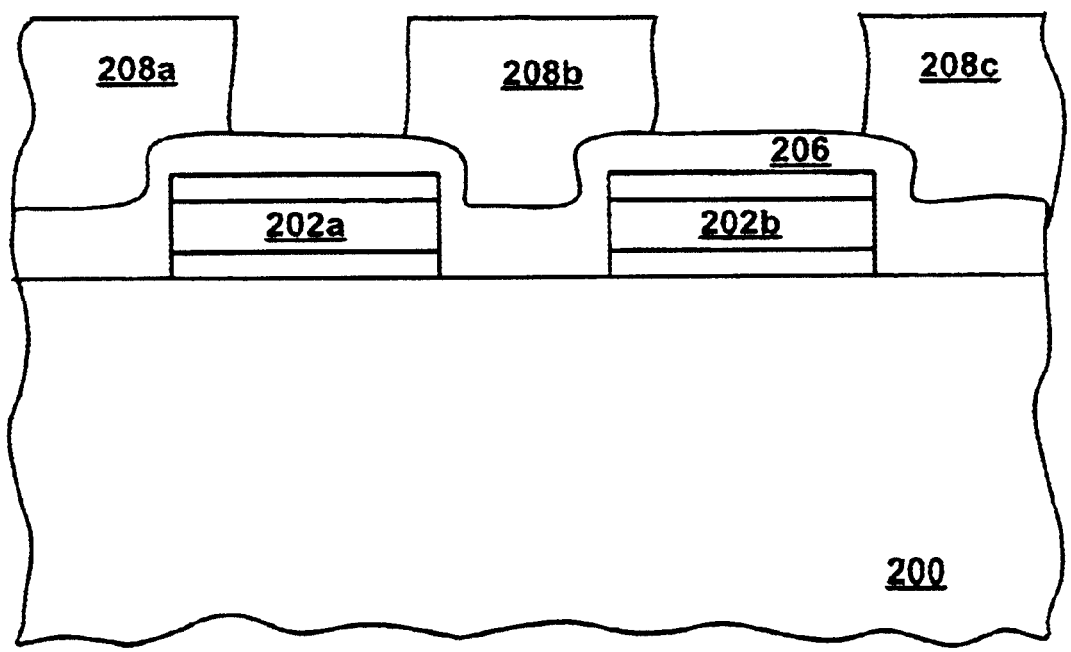
FIG. 2G is a side sectional view of the structure of FIG. 2F wherein the remaining portions of the layer of photosensitive material have been removed in accordance with one embodiment of the present claimed invention.

Referring still to step 408 and now to FIG. 2G, remaining portions 208a, 208b, and 208c of the layer of antireflective coating material are shown after remaining portions 210a, 210b, and 210c of the layer of photosensitive material have been removed therefrom. One significant benefit realized by the present invention, in addition to shielding underlying devices from incident light, is the gap filling aspect of remaining portions 208a, 208b, and 208c of the layer of antireflective coating material. That is, remaining portions 208a, 208b, and 208c of the layer of antireflective coating material serve to improve the topography of the structure such that any subsequently deposited overlying passivation layer is not subjected to the excessive step height found in conventional backplane structures. The present invention is also well suited to varying the thickness of remaining portions 208a, 208b, and 208c of the layer of antireflective coating material to compensate for step height differences between adjacent ones of the plurality of metal pixels and such that adherence of the passivation layer is improved. As a result, the present embodiment improves the integrity of a subsequently deposited thin composite passivation layer.

Figure 2H:
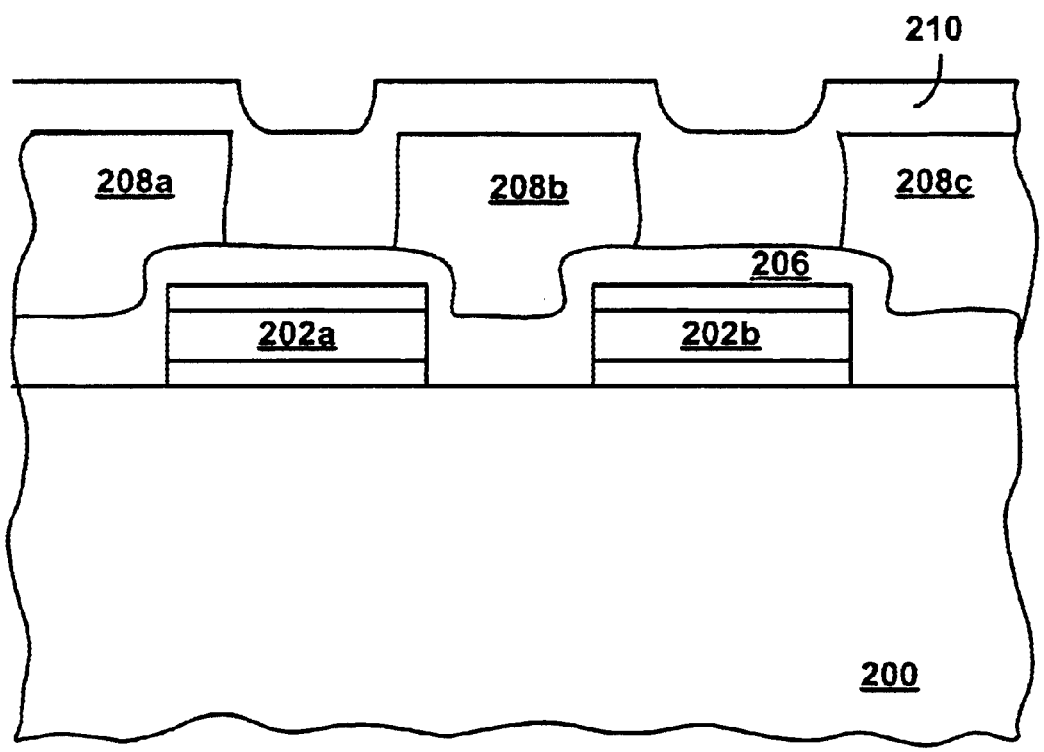
FIG. 2H is a side sectional view of the structure of FIG. 2G wherein a thin composite passivation layer (ON) has been deposited thereover in accordance with one embodiment of the present claimed invention.

Referring now to step 410 and to FIG. 2H, the present invention then deposits a thin composite passivation layer 210 above the structure of FIG. 2G (e.g. the plurality of metal pixels 202a and 202b and remaining portions 208a, 208b, and 208c of the layer of antireflective coating material). In one embodiment, thin composite passivation layer 210 is comprised, for example, of an oxide (O), oxide/nitride (ON), oxide/nitride/oxide (ONO), or oxide/nitride/oxide/nitride (ONON) layer or the like (can be as many as six layers), optimized for reflectance. This together with layer 34 (TEOS and cap) will form an optical interface and passivation layer on the reflective metal pixel. In one embodiment, this O, ON, ONO, or ONON or the like layer will have a total thickness of between about 500 and 10,000 Angstroms. Although such materials and thicknesses are recited in the present embodiment, the present embodiment is well suited to the use of various other materials having various other respective thicknesses.

With reference now to FIG. 5, a flow chart 500 is shown of steps performed in accordance with another embodiment of the present claimed invention. With reference now to FIG. 3A, a side sectional view of a portion of a backplane of a microdisplay structure is shown. The structure of FIG. 3A shows a plurality of metal pixels formed above a substrate. For purposes of clarity, many of the underlying elements (such as, for example, those shown in Prior Art FIG. 1) are not shown in FIG. 3A. Furthermore, although not shown in FIG. 3A, for purposes of clarity, it will be understood that metal pixels 202a and 202b are electrically coupled to underlying structures which extend into substrate 200 (e.g. active devices 14). Additionally, the present embodiment is well suited to use with a plurality of metal pixels which are formed at a metal layer other than the metal layer of FIG. 3A. That is, the present embodiments are not limited to use with metal pixels formed using a specific one of the many metal layers used in the formation of conventional LCD devices. Also, although only two metal pixels 202a and 202b are shown in FIG. 3A, it will be understood that such a limited number of metal pixels is shown for purposes of clarity.

Referring still to FIG. 3A and now to step 502 of FIG. 5, in the present embodiment, the plurality of metal pixels 202a and 202b are formed having a gap region 204 disposed therebetween. In some instances, the depth of gap region 204 may be exacerbated by overetching of the metal layer from which metal pixels 202a and 202b are formed. As mentioned above, this gap depth (also referred to a step height) can result in poor sidewall coverage and may ultimately compromise the integrity of a subsequently deposited layer of thin passivation. As shown in FIG. 3A, incident light, represented by arrows 205, may pass through gap region 204 between metal pixels 202a and 202b and ultimately impinge underlying active devices (e.g. active devices 14 of Prior Art FIG. 1). Such impingement by incident light 205 poses a threat to device operation due to photoelectron generation/interference. As will be discussed below, the present invention provides a solution to the aforementioned problem.

Referring now to FIG. 3B, and to step 504, the present embodiment then deposits a layer of antireflective coating material 208 above layer of liner material 206, above plurality of metal pixels 202a and 202b and into gap region 204. In one embodiment, antireflective coating material 208 is deposited within gap region 204 to a thickness of approximately 6000–8000 Angstroms. Although such a thickness is recited for antireflective coating material 208 in the present embodiment, the present invention is well suited to the use with an antireflective coating material which is deposited to a greater or lesser depth. Furthermore, in one embodiment, antireflective coating material 208 is comprised of an organic antireflective coating material such as, for example, organic BARC. In yet another embodiment, antireflective coating material 208 is comprised of an inorganic antireflective coating material such as, for example, SiON. Although such materials are recited in the present embodiment, the present embodiment is well suited to the use of various other antireflective coating materials.

Referring still to step 504 and now to FIGS. 3C and 3D, in one embodiment of the present invention, a layer of photosensitive material 210 such as, for example, photoresist is deposited above antireflective coating material 208. As shown in FIG. 3D, layer of photosensitive material 210 is then patterned using a reverse of the top metal mask to form a mask (see e.g. regions 210a, 210b, and 210c) so that the underlying antireflective coating material 208 is placed only above the gap region.

Referring now to step 506 and now to FIG. 3E, using the mask formed by regions 210a, 210b, and 210c of layer of photosensitive material 210, the present embodiment substantially removes layer of antireflective coating material 208 from above a huge portion of plurality of metal pixels 202a and 202b such that the antireflective coating material (see e.g. regions 208a, 208b, and 208c) remains primarily within the gap regions (e.g. gap region 204) between the plurality of metal pixels 202a and 202b. That is, those portion of the antireflective coating material which were not covered by the photosensitive material are removed. The remaining portions 208a, 208b, and 208c of the antireflective coating material serve as a barrier to the incident light shown in FIG. 3A. Thus, remaining portions 208a, 208b, and 208c of the antireflective coating material reduce the transmission of incident light 205 through gap region 204 and towards active devices 14 of Prior Art FIG. 1. As a result, the present invention reduces impingement by incident light 205 and alleviates the threat to device operation caused by photoelectron generation/interference. Although such a method for forming remaining portions 208a, 208b, and 208c of the antireflective coating material is recited in the present embodiment, the present invention is also well suited to use with an embodiment in which remaining portions 208a, 208b, and 208c of the antireflective coating material are formed using a different method.

As shown in FIG. 3E, in one embodiment of the present invention, remaining portions 208a, 208b, and 208c of the antireflective coating material are made to extend slightly over the edges of metal pixels 202a and 202b by slightly under exposing the reverse top metal mask. That is, in one embodiment of the present invention, remaining portions 208a, 208b, and 208c of the layer of antireflective coating material "wrap around" gap region 204 to provide a effective barrier against incident light.

Referring still to step 506 and now to FIG. 3F, remaining portions 208a, 208b, and 208c of the layer of antireflective coating material are shown after remaining portions 210a, 210b, and 210c of the layer of photosensitive material have been removed therefrom. One significant benefit realized by the present invention, in addition to shielding underlying devices from incident light, is the gap filling aspect of remaining portions 208a, 208b, and 208c of the layer of antireflective coating material. That is, remaining portions 208a, 208b, and 208c of the layer of antireflective coating material serve to improve the topography of the structure such that any subsequently deposited overlying passivation layer is not subjected to the excessive step height found in conventional backplane structures. The present invention is also well suited to varying the thickness of remaining portions 208a, 208b, and 208c of the layer of antireflective coating material to compensate for step height differences between adjacent ones of the plurality of metal pixels and such that adherence of the passivation layer is improved. As a result, the present embodiment improves the integrity of a subsequently deposited layer of thin composite passivation.

Referring now to step 508 and to FIG. 3G, the present invention then deposits a thin composite passivation layer 210 above the structure of FIG. 3F (e.g. the plurality of metal pixels 202a and 202b and remaining portions 208a, 208b, and 208c of the layer of antireflective coating material). In one embodiment the composite passivation layer 210 is comprised, for example, of a nitride (N), nitride/oxide (NO), or nitride/oxide/nitride (NON) layer or the like (can be as many as six layers), optimized for reflectance. This together with layer 35 (TEOS cap) will form an optical interface layer and passivation layer. In one embodiment, this N, NO, or NON or the like layer will have a total thickness of between about 500 and 4,000 Angstroms. Although such materials and thicknesses are recited in the present embodiment, the present embodiment is well suited to the use of various other materials having various other respective thicknesses.

Thus, the present invention provides a display device formation method and apparatus which reduces the penetration of incident ambient light into the backplane. The present invention further provides a display device formation method and apparatus which achieves the above accomplishment and reduces the excessive step height between pixels thus reducing liquid crystal alignment difficulty and improving passivation integrity.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications are suited to the particular use contemplated. It is intended that the scope of the invention be defined by the Claims appended hereto and their equivalents.

What is claimed is:

1. In a display device, a light shield structure for reducing the transmission of incident light through a gap region located between adjacent ones of a plurality of metal pixels, said light shield structure comprised of:

an antireflective coating material deposited primarily within said gap region to form a light shield such that transmission of incident light through said gap region towards underlying active devices is reduced;

a composite passivation layer disposed above said plurality of metal pixels and said antireflective coating material; and a layer of liner material deposited above said plurality of metal pixels and into said gap region, wherein said antireflective coating material is deposited within said gap region with sufficient thickness to compensate for step height differences between said adjacent ones of said plurality of metal pixels and to improve adherence and integrity of said thin composite passivation layer and ease an LC alignment process.

2. The light shield structure for reducing the transmission of incident light through a gap region located between adjacent ones of a plurality of metal pixels of claim 1 wherein said antireflective coating material within said gap region has a thickness of approximately 6000–8000 Angstroms.

3. The light shield structure for reducing the transmission of incident light through a gap region located between adjacent ones of a plurality of metal pixels of claim 1 wherein said antireflective coating material is comprised of an organic material.

4. The light shield structure for reducing the transmission of incident light through a gap region located between adjacent ones of a plurality of metal pixels of claim 1 wherein said antireflective coating material is comprised of an inorganic material.

5. The light shield structure for reducing the transmission of incident light through a gap region located between adjacent ones of a plurality of metal pixels of claim 3 wherein said antireflective coating material is comprised of organic BARC.

6. The light shield structure for reducing the transmission of incident light through a gap region located between adjacent ones of a plurality of metal pixels of claim 4 wherein said antireflective coating material is comprised of TiN or SiON.

7. The light shield structure for reducing the transmission of incident light through a gap region located between adjacent ones of a plurality of metal pixels of claim 1 wherein said layer of liner material is selected from the group consisting of: $Si_3N_4$.

* * * * *